United States Patent
Schroeder et al.

[11] Patent Number: 5,916,014
[45] Date of Patent: *Jun. 29, 1999

[54] OSCILLATING BELT/SPINDLE SANDER

[75] Inventors: James D. Schroeder, St. Peters; George E. Hendrix, Florissant, both of Mo.

[73] Assignee: Emerson Special Products Division, Hazelwood, Mo.

[*] Notice: This patent is subject to a terminal disclaimer.

[21] Appl. No.: 08/631,822

[22] Filed: Apr. 10, 1996

Related U.S. Application Data

[63] Continuation-in-part of application No. 08/233,278, Apr. 26, 1994, Pat. No. 5,549,507.

[51] Int. Cl.[6] .................................................. B24B 7/00
[52] U.S. Cl. ........................ 451/121; 451/157; 74/22 R
[58] Field of Search ............................ 451/120, 121, 451/157, 296, 304, 311; 74/22 R, 57

[56] References Cited

U.S. PATENT DOCUMENTS

| | | | |
|---|---|---|---|
| 575,187 | 1/1897 | Welker | 451/304 |
| 1,071,814 | 2/1913 | Maddox | 451/311 |
| 1,189,557 | 7/1916 | Gardner . | |
| 2,416,493 | 2/1947 | Newton | 451/311 |
| 2,575,442 | 11/1951 | Cooley . | |
| 3,136,097 | 6/1964 | Liard | 451/304 |
| 3,418,758 | 12/1968 | McEwan | 451/121 |
| 3,812,574 | 5/1974 | Jones et al. . | |
| 3,855,869 | 12/1974 | Dimitrov . | |
| 3,868,791 | 3/1975 | Burns . | |
| 3,903,657 | 9/1975 | Pfister . | |
| 3,974,595 | 8/1976 | Wolf et al. | 451/158 |
| 4,558,538 | 12/1985 | Green . | |
| 4,821,457 | 4/1989 | Ianuzzi . | |
| 4,889,613 | 12/1989 | McNeal et al. | 204/416 |
| 4,977,708 | 12/1990 | Kloft | 451/311 |
| 5,045,741 | 9/1991 | Dvorsky | 310/209 |
| 5,335,560 | 8/1994 | Wang | 74/22 |
| 5,399,125 | 3/1995 | Dozier | 451/303 |
| 5,402,604 | 4/1995 | Hashii et al. | 451/155 |
| 5,412,889 | 5/1995 | Hou | 40/411 |
| 5,476,409 | 12/1995 | Wada et al. | 451/12 |

*Primary Examiner*—Robert C. Watson
*Attorney, Agent, or Firm*—Arnold, White & Durkee

[57] ABSTRACT

An oscillating belt sander or spindle sander is disclosed. The sander includes a motor shaft that extends upwardly through a worktable that supports a workpiece. The motor shaft supports a belt sander or spindle sander sanding surface. A combined motor and mechanical drive transmits rotational and reciprocating motion to the motor shaft which includes input and output motor shaft ends. The motor operates to impart rotational motion through the output motor shaft end while the mechanical drive is connected to the input motor shaft end and also imparts reciprocating motion through the output motor shaft end. The output motor shaft end facilitates interchangeable mounting of a spindle sander sleeve or a sanding belt. Thus, the sander is readily adaptable for conversion to a belt sander or spindle sander, as may be desired.

22 Claims, 14 Drawing Sheets

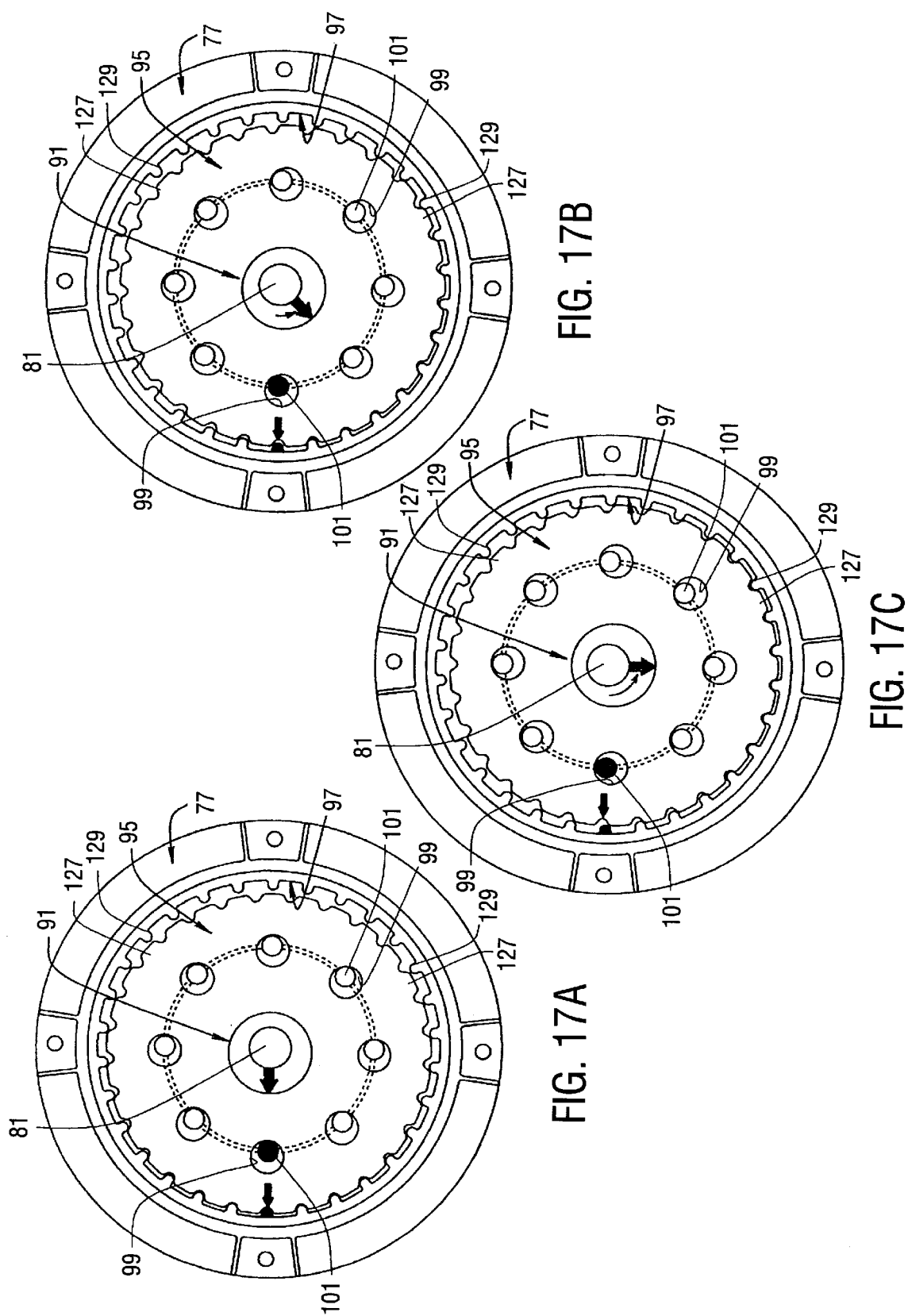

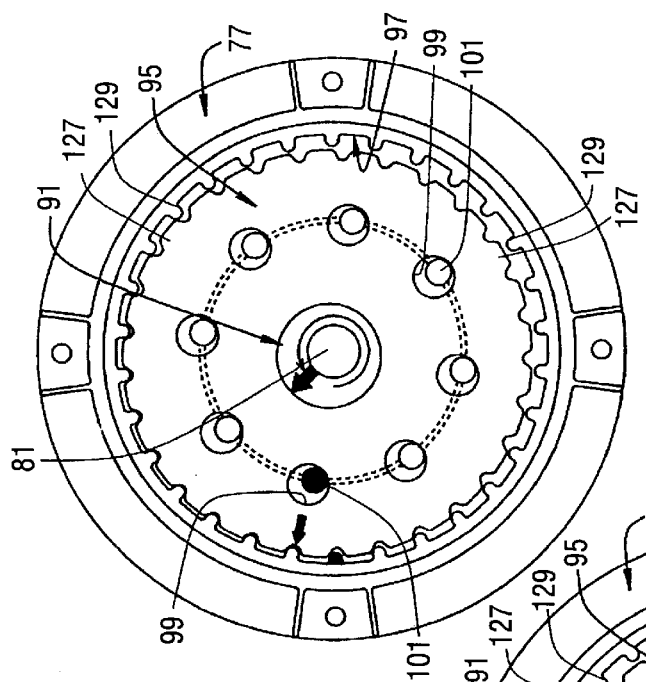
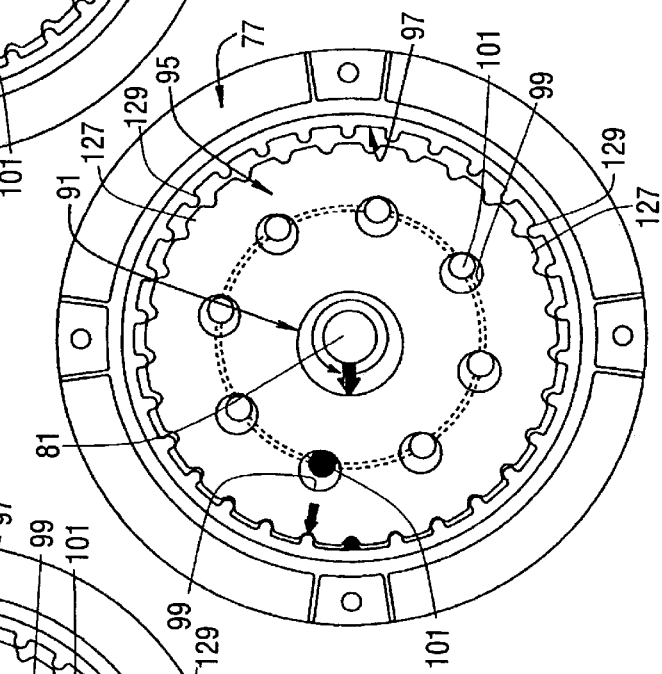
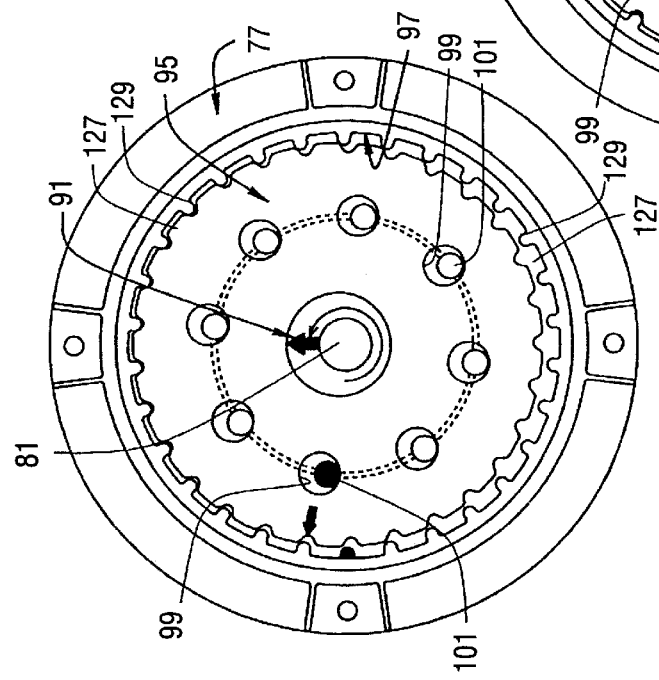

OSCILLATING BELT/SPINDLE SANDER

CROSS REFERENCE TO RELATED APPLICATION

This is a continuation-in-part of copending patent application Ser. No. 08/233,278 filed Apr. 26, 1994 entitled COMBINED MOTOR AND MECHANICAL DRIVE USED IN OSCILLATING SPINDLE SANDER, assigned to the same assignee as the present invention, now U.S. Pat. No. 5,549,507.

BACKGROUND OF THE INVENTION

The present invention relates to an oscillating belt sander/spindle sander, and more particularly, to a combined motor and mechanical drive for transmitting rotational and reciprocating motion to an output motor shaft end which is constructed to facilitate conversion between an oscillating belt sander or spindle sander, as may be desired.

In my aforementioned co-pending patent application Ser. No. 08/233,278 filed Apr. 26, 1994, now U.S. Pat. No. 5,549,507, a combined motor and mechanical drive is disclosed that provides simultaneous rotary and reciprocating or axial movement of an output motor shaft for use with an oscillating spindle sander or the like. With a spindle sander sleeve attached to the output motor shaft, the spindle sander sleeve reciprocates or oscillates at a speed much slower than it rotates. Typically, the spindle sander sleeve rotates at 1725 rpm while moving up and down in an oscillating movement approximately 60 times per minute over a range of approximately ¾". This dual rotary and oscillating movement allows the spindle sander to remove a large amount of material from a wood workpiece in a very rapid manner without creating scratch patterns that are characteristic of a conventional drum sander. For both rough shaping and final finish sanding, this combined up and down and around movement is very helpful.

Following development of the aforementioned rotating and oscillating movement for spindle sanders, it was discovered that belt sanders could also favorably employ a rotating sanding belt that would reciprocate or oscillate, as well. Sanding results similar to the aforementioned spindle sanders could thus be favorably achieved.

In developing such belt sander, it was discovered that the combined motor and mechanical drive, disclosed in aforementioned co-pending patent application Ser. No. 08/233, 278 filed Apr. 26, 1994, now U.S. Pat. No. 5,544,507, could also be usefully employed. To maximize use of the combined motor and mechanical drive for spindle sanders as well as belt sanders, it was further discovered that the output motor shaft of the combined motor and mechanical drive could be constructed and/or arranged to facilitate interchangeable mounting of a spindle sander to a belt sander. Thus, the same combined motor and mechanical drive could be employed for use with an interchangeable mounting system to facilitate conversion from a spindle sander to a belt sander.

While some prior art developments, notably U.S. Pat. No. 4,939,870 and European Patent Application No. 060862582, have disclosed the desirability of using the same drive for use with a belt sander or spindle sander, no prior art device has considered the adaptability and performance of the aforementioned combined motor and mechanical drive for a spindle sander or belt sander. Moreover, no prior art device has considered the use of simple and practical conversion devices that can be employed for converting a spindle sander to a belt sander, as will be apparent from the discussion that follows.

SUMMARY OF THE INVENTION

Among the several objects and advantages of the present invention include:

The provision of a new and improved combined motor and mechanical drive for use with belt or spindle sanders;

The provision of the aforementioned new and improved combined motor and mechanical drive that provides rotational movement at speeds substantially greater than the reciprocating or oscillating movement of the belt or spindle sander;

The provision of the aforementioned new and improved combined motor and mechanical drive which facilitates interchangeable mounting of a belt or spindle sander, as may be desired;

The provision of the aforementioned new and improved combined motor and mechanical drive with new and improved conversion devices and apparatus that provide simple and practical conversion to a belt or spindle sander, as may be desired.

The provision of the aforementioned new and improved combined motor and mechanical drive which is reliable, efficient and cost effective as compared with prior art mechanisms;

The provision of the aforementioned new and improved combined motor and mechanical drive that overcomes the problems associated with complex and expensive mechanisms of the prior art;

The provision of the aforementioned new and improved combined motor and mechanical drive which is made of a minimum number of parts, is easy to construct and maintain, is durable and long-lasting in operation, and is relatively economical to produce, particularly as compared to prior art mechanisms.

Briefly stated, the oscillating belt or spindle sander of the present invention includes a worktable for supporting a workpiece. A motor shaft extends upwardly through the worktable and supports a sanding surface. The combined motor and mechanical drive for transmitting rotational and reciprocating motion to the motor shaft includes input and output motor shaft ends. The motor operates to impart rotational motion through the output motor shaft end while the mechanical drive is connected to the input motor shaft end of the motor for also imparting reciprocating motion through the output motor shaft end. The mechanical drive is contained within a housing that is mounted to the motor. The output motor shaft end provides interchangeable mounting of different sanding surfaces.

The sanding surface is either a spindle sanding sleeve surface or a sanding belt surface. The output motor shaft end interchangeably receives a spindle sander sleeve or a sanding belt.

The output motor shaft end may include external splines for complementary reception by an internally splined element associated with the sanding belt. The internally splined element is an internally splined hub that is part of a drive belt/pulley system for driving the sanding belt.

The output motor shaft end may also include a threaded shaft for threaded connection to the spindle sander sleeve.

Alternatively, a drive shaft may be mounted in laterally offset relationship to the output motor shaft end for directly driving a spindle sander sleeve or a drive drum of a belt platen about which a sanding belt is entrained.

Another alternative embodiment enables the drive drum of a belt platen about which a sanding belt is entrained or a spindle sander sleeve to be directly driven by the output motor shaft end. A further alternate embodiment enables the direct driving of a sanding belt only by the output motor shaft end.

The input motor shaft end is interconnected to the mechanical drive which is operably connected to the housing for imparting reciprocating motion to the output motor shaft end. The motor shaft drives a speed reducer that is coaxial with the motor shaft, the speed reducer having a cam follower that engages a cam in the housing for imparting the reciprocating motion to the output motor shaft end. The speed reducer includes a cycloidal gear that engages a complementary ring gear provided in the housing.

These and other objects and advantages will become apparent from the description that is to follow.

BRIEF DESCRIPTION OF THE DRAWINGS

In the drawings.

FIG. 17A is a partially schematic top plan view of the mechanical drive illustrating the position of the cycloid gear and housing ring gear relative to the output element/cam follower and eccentric where the position of the motor shaft is illustrated by associated arrow at 0° rotation;

FIG. 17B is a partially schematic top plan view of the mechanical drive illustrating the position of the cycloid gear and housing ring gear relative to the output element/cam follower and eccentric where the position of the motor shaft is illustrated by associated arrow at 45° rotation;

FIG. 17C is a partially schematic top plan view of the mechanical drive illustrating the position of the cycloid gear and housing ring gear relative to the output element/cam follower and eccentric where the position of the motor shaft is illustrated by associated arrow at 90° rotation;

FIG. 17G is a partially schematic top plan view of the mechanical drive illustrating the position of the cycloid gear and housing ring gear relative to the output element/cam follower and eccentric where the position of the motor shaft is illustrated by associated arrow at 270° rotation;

FIG. 17H is a partially schematic top plan view of the mechanical drive illustrating the position of the cycloid gear and housing ring gear relative to the output element/cam follower and eccentric where the position of the motor shaft is illustrated by associated arrow at 315° rotation; and FIG. 17I is a partially schematic top plan view of the mechanical drive illustrating the position of the cycloid gear and housing ring gear relative to the output element/cam follower and eccentric where the position of the motor shaft is illustrated by associated arrow at 360° rotation.

Corresponding reference numerals will be used throughout the several figures of the drawings.

DESCRIPTION OF THE PREFERRED EMBODIMENTS

The following detailed description illustrates the invention by way of example and not by way limitation. This description will clearly enable one skilled in the art to make and use the invention, and describes several embodiments, adaptions, variations, alternatives and uses of the invention, including what I presently believe is the best mode of carrying out the invention.

Figure 1:
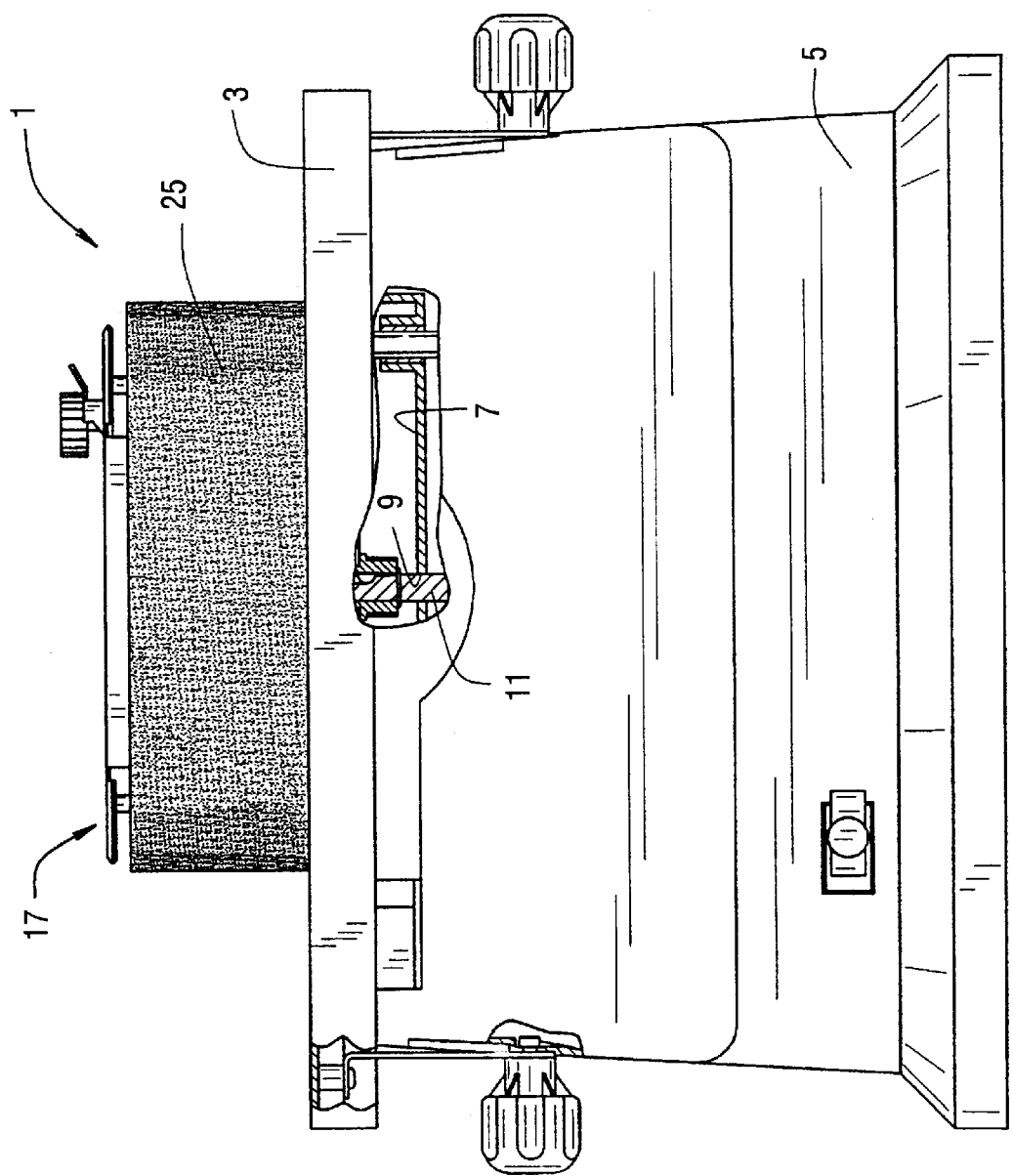
FIG. 1 is a fragmentary side elevational view, partly in section, of the oscillating belt or spindle sander of the present invention illustrating use as a belt sander.
Figure 2:
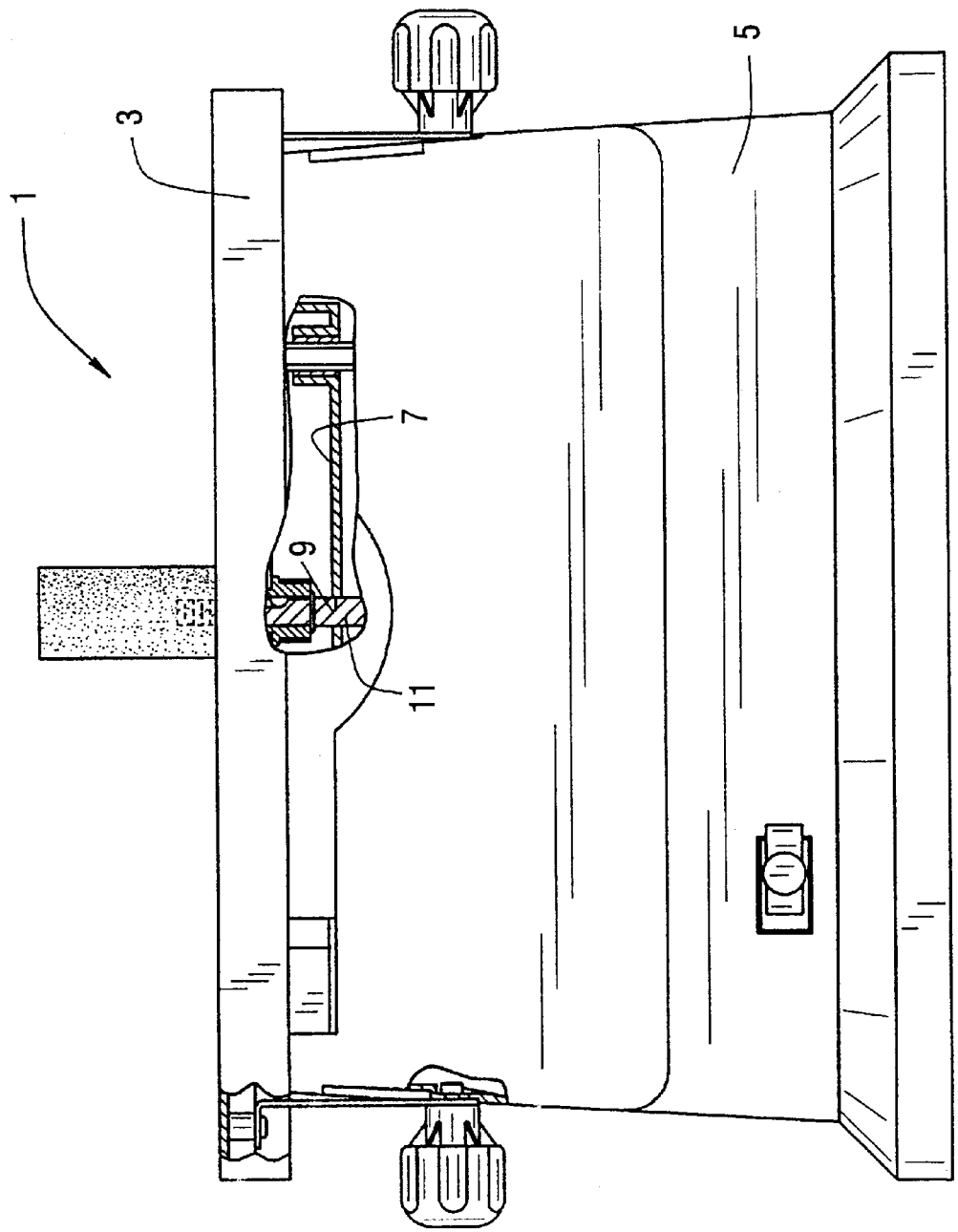
FIG. 2 is a fragmentary side elevational view, partly in section, of the oscillating belt or spindle sander of the present invention illustrating use as a spindle sander.
Figure 12:
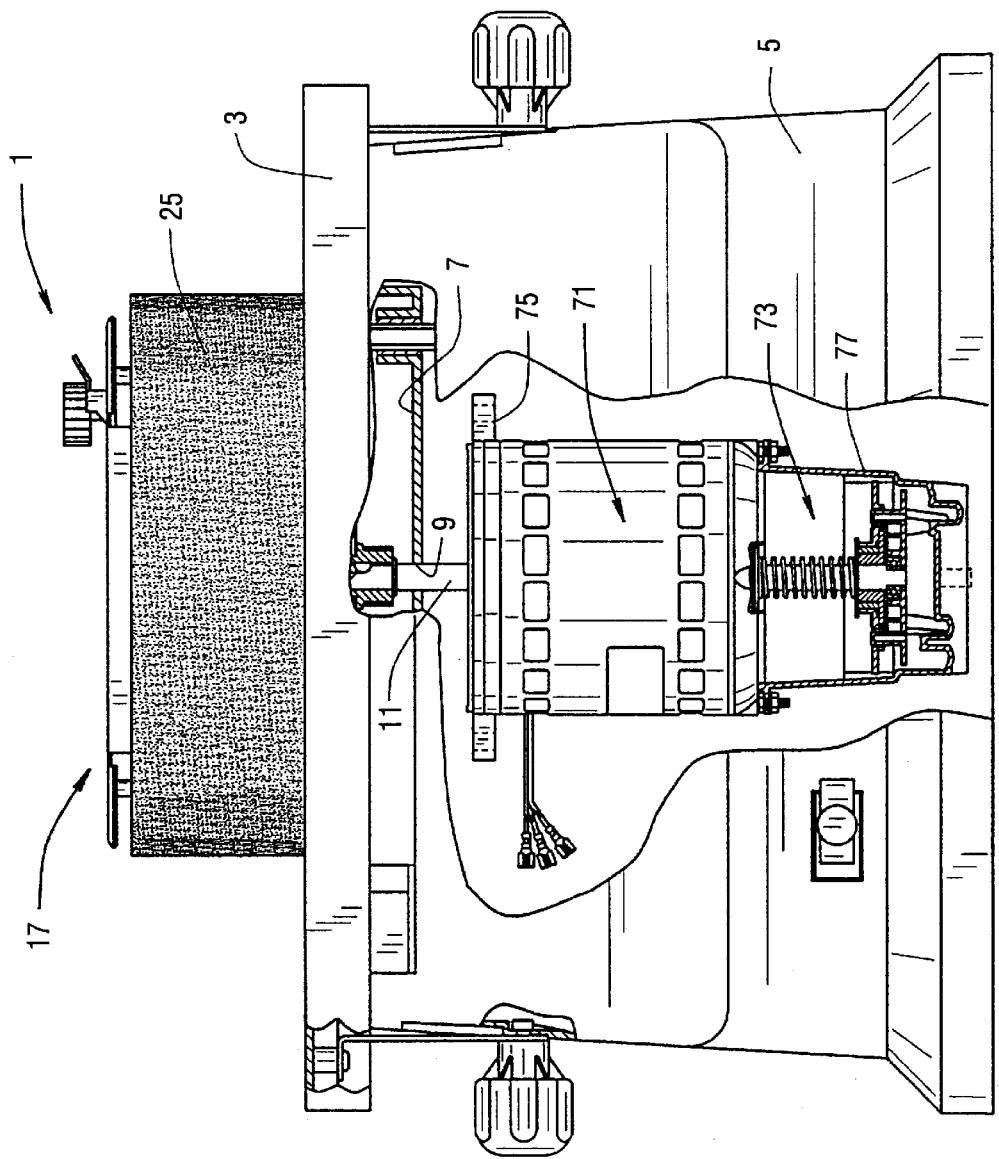
FIG. 12 is a fragmentary side elevational view, partly in section, of the combined motor and mechanical drive that is used to drive the oscillating belt/spindle sander of the present invention.
Figure 13:
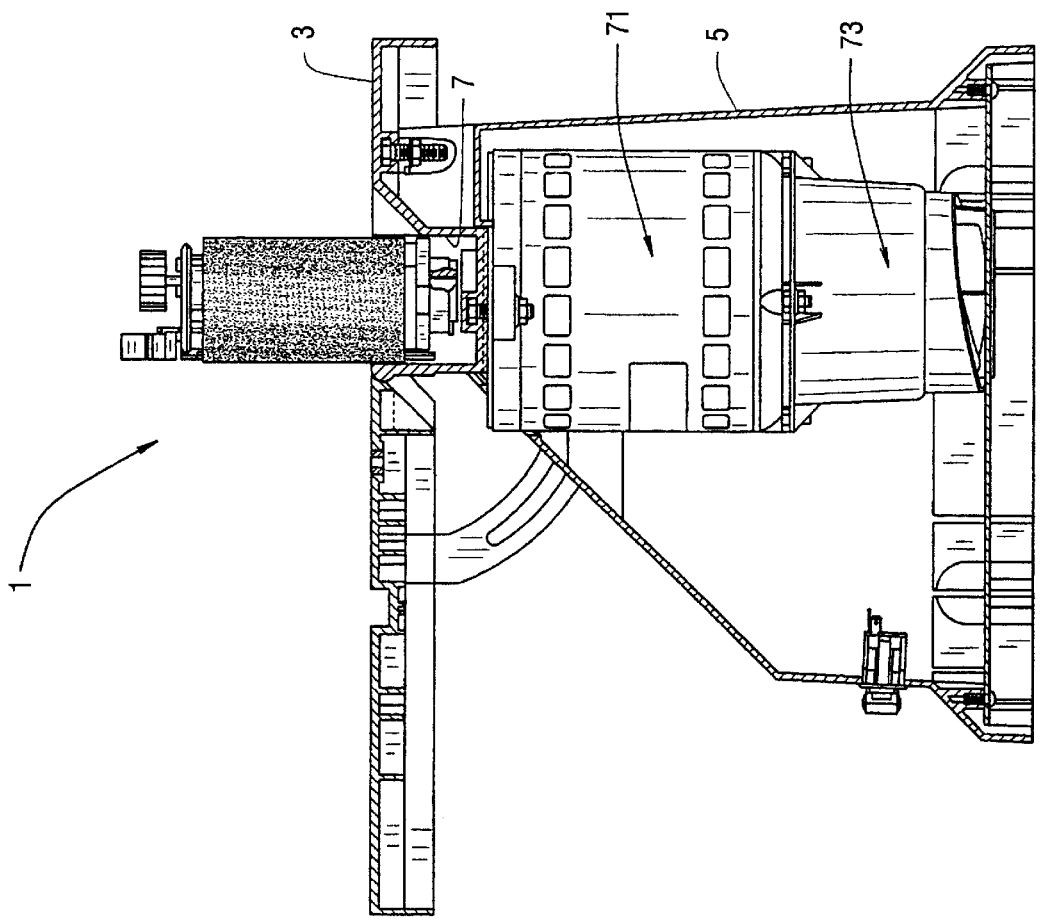
FIG. 13 is an end elevational view, partly in section, of the combined motor and mechanical drive that drives the oscillating belt/spindle sander of the present invention.

The oscillating belt/spindle sander of the present invention is best illustrated in FIGS. 1–2 and 12–13 of the drawings. FIGS. 1 and 12–13 illustrate the sander as being used as an belt sander, while FIG. 2 of the drawings illustrates the sander 1 as being used as a spindle sander. The sander 1 includes a worktable 3 that is supported by a base or frame 5.

The worktable 3 includes a well or depression 7 for at least partially receiving a belt sander sanding surface or spindle sander sanding surface within the well or depression 7, as will be explained further below.

The well or depression 7 includes an opening 9 for receiving a motor shaft 11 that extends through the opening 9 into the well or depression 7. As will be discussed below, the motor shaft 11 is preferably constructed or arranged to facilitate interchangeable mounting of a sanding belt or a spindle sander sleeve to readily adapt the sander 1 for conversion to a belt sander or spindle sander, as may be desired. The motor shaft 11 is part of a combined motor and mechanical drive that transmits rotational and reciprocating or oscillating motion to the motor shaft 11, as will be discussed in detail below in connection with FIGS. 9–17 of the drawings. The rotational and reciprocating motion of the motor shaft also imparts rotational and reciprocating motion to a sanding belt for the belt sander or to a sanding sleeve for the spindle sander, in order to provide the dual rotating and reciprocating or oscillating motion that is desired for favorable rough shaping and final finish sanding results.

Figure 3:
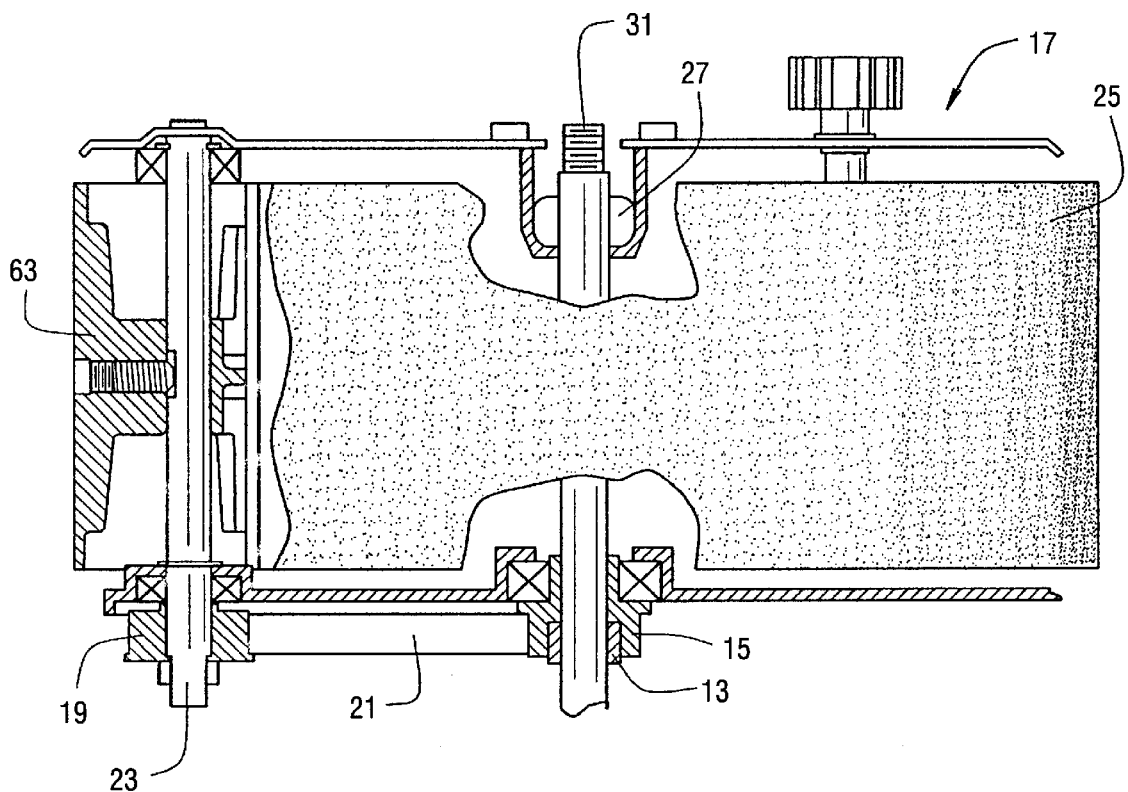
FIG. 3 is a fragmentary side elevational view, partly in section, illustrating the interchangeable mounting of a sanding belt to a rotating and reciprocating drive shaft that is driven by the combined motor and mechanical drive shown in FIGS. 11–17.
Figure 4:
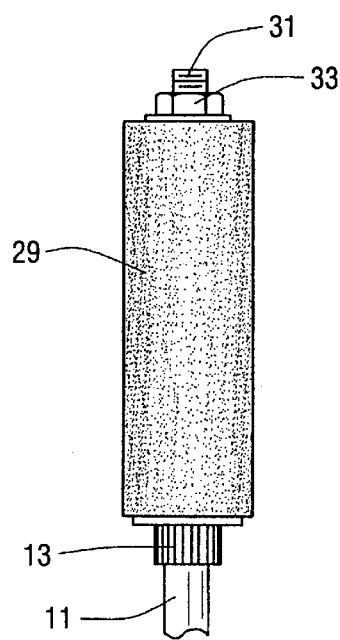
FIG. 4 is a fragmentary side elevational view, partly in section, of the interchangeable mounting of a spindle sander sleeve to the output motor shaft end of a drive shaft that is driven by the combined motor and mechanical drive system shown in FIGS. 11–17.
Figure 5:
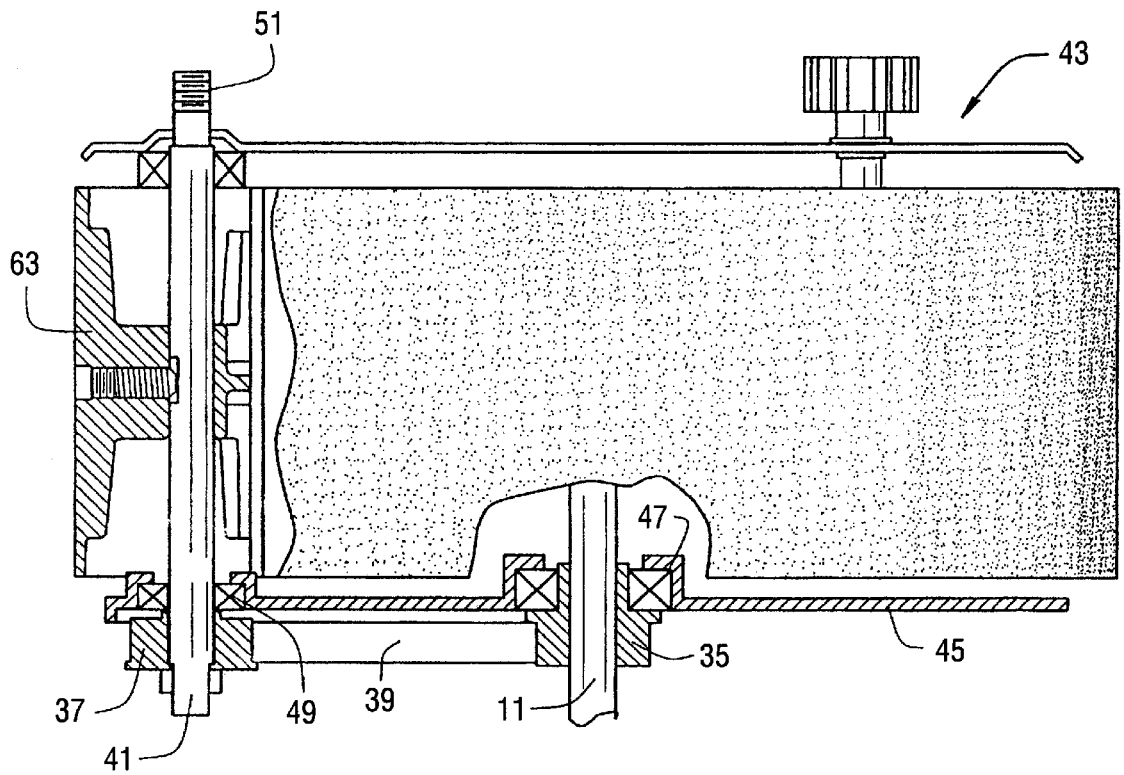
FIG. 5 is a fragmentary side elevational view, partly in section, of an alternative embodiment illustrating the driving of a sanding belt by a separate drive shaft laterally spaced from the output motor shaft end of a drive shaft that is driven by the combined motor and mechanical drive system shown in FIGS. 11–17.
Figure 6:
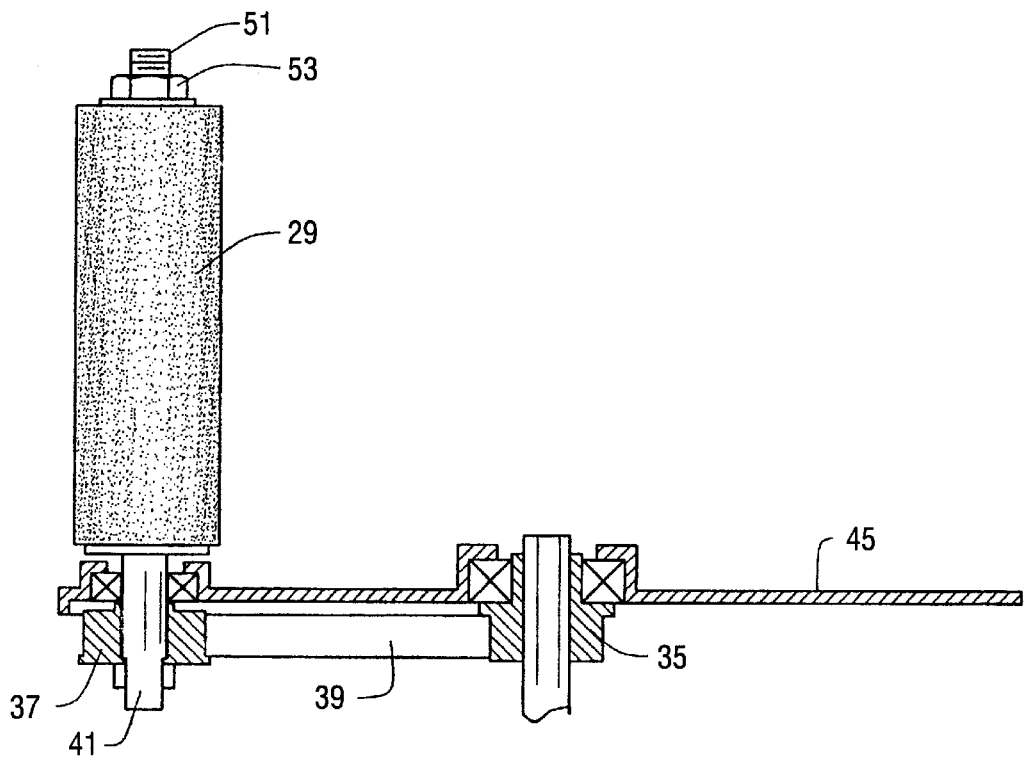
FIG. 6 is a fragmentary side elevational view, partly in section, of the alternative embodiment shown in FIG. 5 and illustrating the separate drive shaft as driving a spindle sander sleeve.
Figure 7:
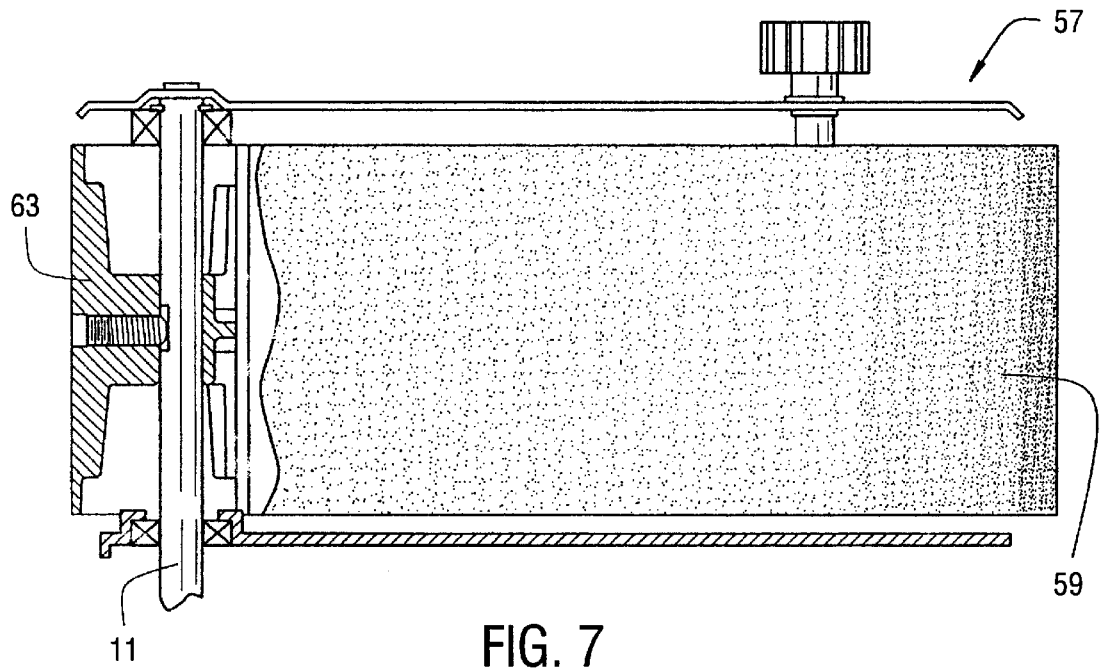
FIG. 7 is a fragmentary side elevational view, partly in section, of a further embodiment depicting the output motor shaft end of a drive shaft directly driving a driven drum of a drive belt/pulley system.
Figure 8:
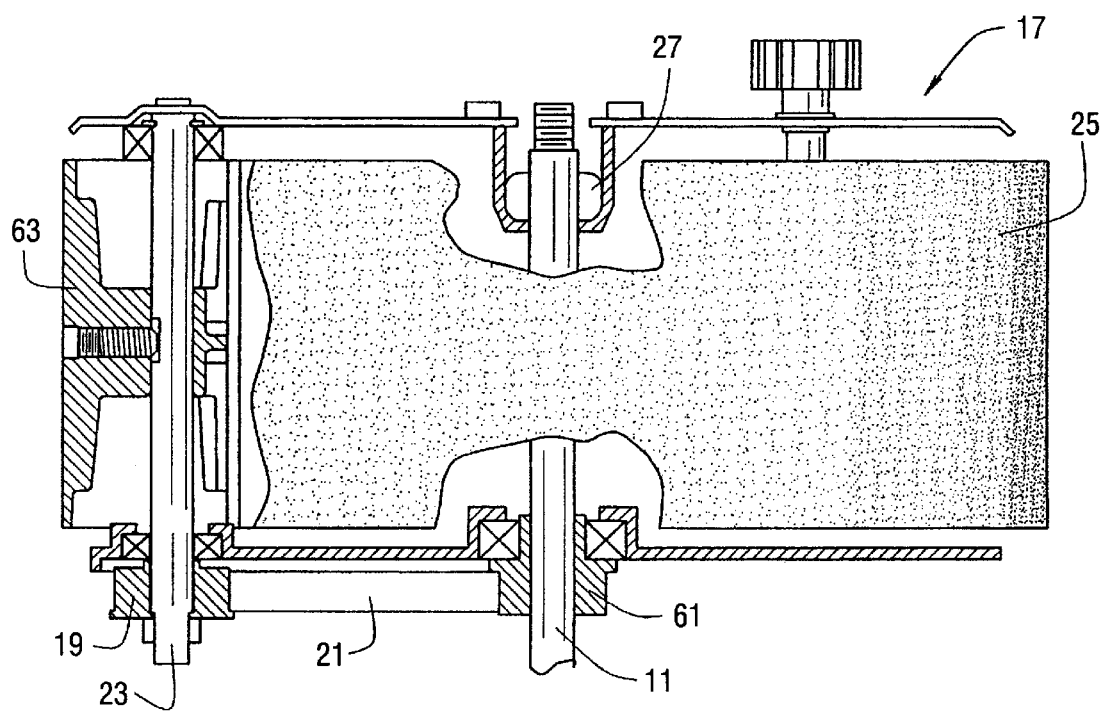
FIG. 8 is a fragmentary side elevational view, partly in section, of still another embodiment showing a direct driving mechanism for a drive belt/pulley system only.

Prior to discussing the combined motor and mechanical drive which transmits both rotational and reciprocating or axial motion to the output shaft 11, attention is first directed to FIGS. 3–8 of the drawings for a description of the various ways in which a spindle sander sleeve or sanding belt can be mounted in the sander 1. FIGS. 3–4 illustrate a preferred embodiment for interchangeable mounting of a belt sander (FIG. 3) to a spindle sander (FIG. 4); FIGS. 5–6 illustrates an alternate embodiment for interchangeable mounting from a belt sander (FIG. 5) to a spindle sander (FIG. 6); FIG. 7 illustrates a further alternative embodiment for conversion from a belt sander to a spindle sander; and FIG. 8 illustrates still a further alternative embodiment for a belt sander only.

In the preferred embodiment of FIGS. 3–4, the output motor shaft 11 includes a male spline collar 13 fixed to the output motor shaft 11 with external splines for engagement with a female or internal spline and drive pulley 15 that is part of a drive belt/pulley system 17 best illustrated and described in connection with FIGS. 9–11 below. The female spline and drive pulley 15 of the drive belt/pulley system 17 drives a driven pulley 19 through the connecting drive belt 21 for driving the drum shaft 23 of the drive drum pulley 63 illustrated in FIGS. 9–11 of the drawings. Through the drive and driven drums 63 and 67, respectively, of the drive belt/pulley system 17 illustrated in FIGS. 9–11 of the drawings, the sanding belt 25 shown in FIG. 3 is driven in the desired manner by being both rotated and reciprocated, through the mechanical drive mechanism 73 described below in connection with FIGS. 12–17 of the drawings.

To provide proper support for the drive belt/pulley system 17, it will be noted in FIG. 3 that the output motor shaft 11 engages a bearing 27 at an upper end of the drive belt/pulley system 17 in order that the sanding belt 25 is suitably structurally supported and mounted for its desired rotating and reciprocating motion. Thus, it will be appreciated that through the male spline element 13 fixed to the output motor shaft 11 and its complementary interengagement with the female spline and drive pulley 15 of the drive belt/pulley system 17, the output motor shaft 11 can readily rotate and reciprocate the sanding belt 25 to provide an oscillating belt sander, as may be desired.

When it is desired to convert the sander 1 from a belt sander to a spindle sander, it is a simple matter to remove a fastening clip or other suitable fastener (not shown) that releasably secures the output motor shaft 11 and its male spline element 13 to the female spline and drive pulley 15, in order to enable removal of the belt drive/pulley system 17 from the output motor shaft 11. After this disassembly is complete, a spindle sander sleeve 29 can be positioned over the output motor shaft end of the output motor shaft 11. This is shown in FIG. 4 of the drawings with the spindle sander sleeve 29 preferably terminating just short of or resting atop the male spline element 13. Since the output motor shaft end of the output motor shaft 11 includes a threaded end 31 at its outermost portion, it is a relatively simply matter to threadably associate a complementary configured nut 33 with the threaded end 31 to mount the spindle sander sleeve 29 on the output motor shaft end of the output motor shaft 11. As a result, interchangeable mounting of different sanding surfaces, such as a sanding belt 25 or a spindle sander sleeve 29, can be interchangeably mounted with respect to the output motor shaft end 11 of the sander 1, as may be desired.

FIGS. 5–6 of the drawings illustrate an alternative embodiment for the interchangeable mounting of a belt sander or spindle sander to the output motor shaft end 11. Specifically, FIG. 5 of the drawings illustrates a pulley 35 fixed to the output motor shaft 11 for driving a laterally offset driven pulley 37 through the connecting drive belt 39. A laterally offset drive shaft 41 is driven by the driven pulley 37. The laterally offset drive shaft 41 drives a driven drum 63 of the drive belt/pulley system 43 which is generally similar to the drive belt/pulley system 17 illustrated in FIGS. 9–11 of the drawings. It will be noted; however, that the alternate embodiment illustrated in FIGS. 5–6 of the drawings includes a support plate 45 that is mounted by bearings 47 resting atop the fixed pulley 35 attached to the output motor shaft 11 and pulley 37 of the laterally offset drive shaft 41. Thus, when the drive belt/pulley system 43 is removed from the laterally offset shaft 41 as illustrated in FIG. 6 of the drawings, the following remain: support plate 45 together with the output motor shaft 11, pulley 35 fixed to the motor shaft 11, laterally offset drive pulley 37, connecting belt 39, and laterally offset drive shaft 41. This readily permits assembly of a spindle sander sleeve 29 over the laterally offset drive shaft 41. Note also that the upper end of the laterally offset drive shaft 41 is threaded at 51 for complementary association with a threaded nut 53 for mounting the spindle sander sleeve 29 relative to the laterally offset drive shaft 41 in the manner illustrated in FIG. 6.

A further alternative embodiment is illustrated in FIG. 7 of the drawings where the output motor shaft 11 is illustrated as directly driving the driving drum 63 of the drive belt/pulley system 57 which is mounted on the output motor shaft 11. Thus, the output motor shaft 11 serves as the direct drive shaft for the driven drum 63 of the drive belt/pulley system 57 for driving the sanding belt 59 entrained about the driving and driven drums of the drive belt/pulley system 57. It will be appreciated that the drive belt/pulley system 57 may be easily removed from the output motor shaft 11, as discussed above, in order to allow a spindle sander sleeve (not shown)

to be mounted over the output motor shaft 11 as in the FIGS. 3–4 and 5–6 embodiments. Thus, the output motor shaft 11, due to its arrangement and positionment relative to the belt drive/pulley system 57, now generally serves as the direct drive for the driven drum 63 of such system, but also enables quick removal of the belt drive/pulley system 57 for easy replacement and conversion to a spindle sander by the mounting of a spindle sander sleeve on the output motor shaft end 11. As in the previous embodiments, the output motor shaft end 11 is preferably threaded in order to permit a complementary nut to be threadably associated with the threaded shaft end for retaining the spindle sander sleeve on the output motor shaft end 11.

A still further alternate embodiment is illustrated in FIG. 8 of the drawings, but is limited solely to a belt sander. Specifically, the illustrated structure is similar to that illustrated in FIG. 3 of the drawings, except that the drive pulley 61 is fixed to the output motor shaft 1. As a result, there is no interchangeable mounting to a spindle sander sleeve as in the other embodiments. Since the remaining components of the alternate embodiment illustrated in FIG. 8 of the drawings are similar to that illustrated in FIG. 3, corresponding reference numerals have been applied to designate like parts, with the exception of the fixed pulley 61 which replaces the male spline element 13 and female spline and drive pulley 15 of the FIG. 3 embodiment.

Figure 9:
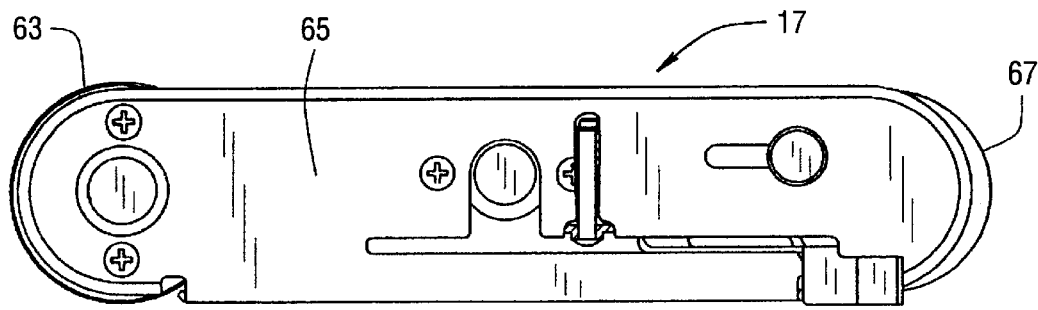
FIG. 9 is a top plan view of a platen bed, including drive and idler rollers, about which a sanding belt is entrained for use as a belt sander.
Figure 10:
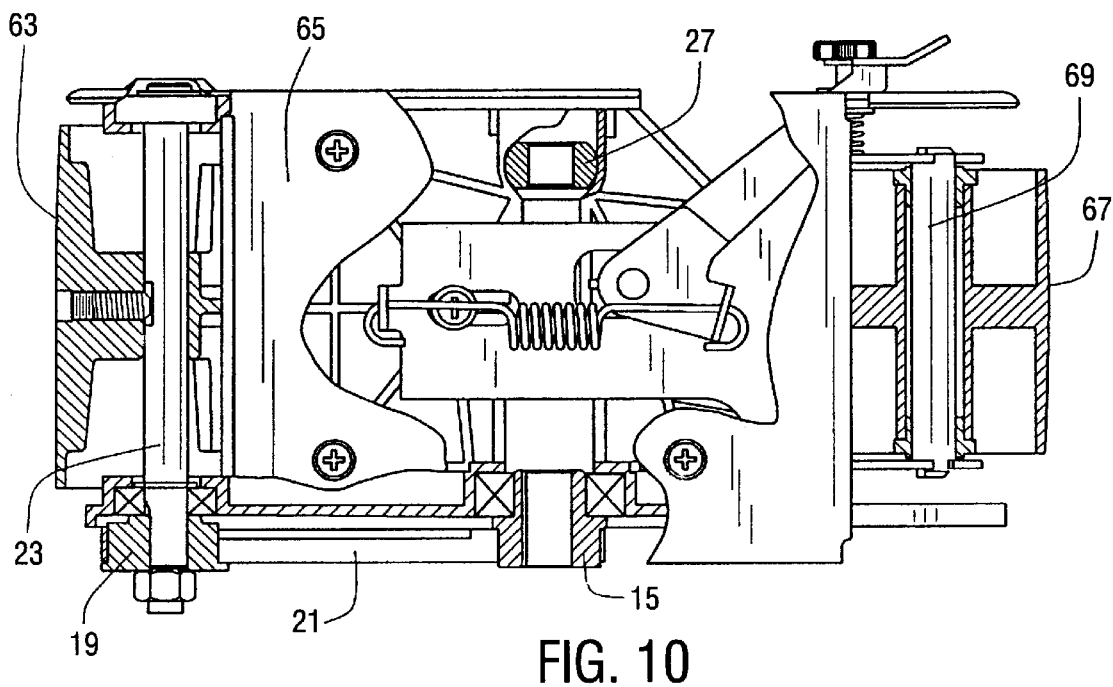
FIG. 10 is a fragmentary side elevational view, partly in section, of the bed platen, including driven and idler drums and tensioning mechanism, used in connection with a sanding belt for a belt sander.
Figure 11:
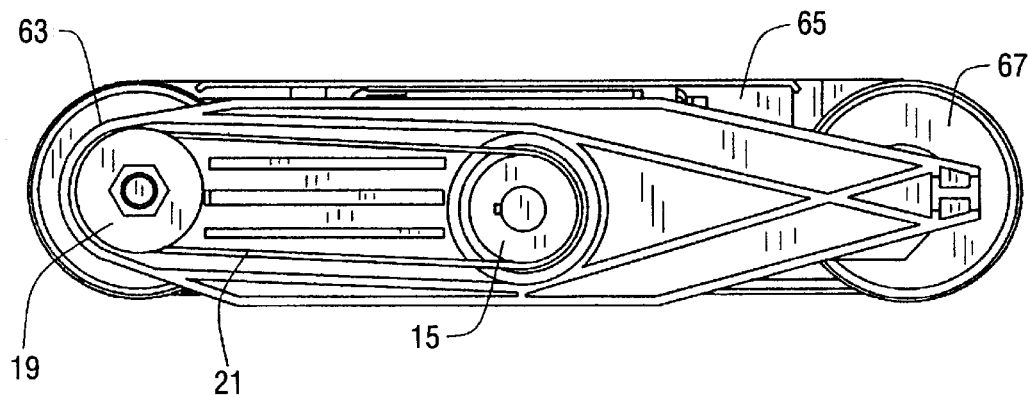
FIG. 11 is a bottom plan view of the bed platen shown in FIG. 10.

FIGS. 9–11 of the drawings illustrate a typical drive belt/pulley system 17 such as used in FIG. 3 of the drawings, as well as the alternative embodiments illustrated in FIGS. 5 and 7–8 of the drawings. Specifically, the drive belt/pulley system 17 includes the female spline and drive pulley 15, the connecting belt 21 which drives the driven pulley 19 and a drive drum shaft 23 as described above in connection with FIG. 3 of the drawings. In addition, the drive drum shaft 23 drives a drive drum 63 at one end of the platen bed 65. At an opposite end, a idler drum 67 rotates on an idler shaft 69 that is also mounted to the platen bed 65. The platen bed 65 is also provided with a tensioning mechanism 71 for tensioning the drive drum 63 and driven drum 67 relative to the sanding belt, such as the sanding belt 25 as shown in FIG. 3 of the drawings, for appropriate tensioning and mounting of the sanding belt 25 relative to the drive belt/pulley system 17. A bearing element 27 is mounted in the platen bed 65 at an upper end to facilitate mounting of the output motor shaft end of the output motor shaft 11, as has been described above in connection with FIG. 3 of the drawings.

The belt drive/pulley systems 43 of the FIG. 5 embodiment and 57 of the FIG. 7 embodiment are constructed in a similar way to the drive belt/pulley system 17 shown in FIGS. 9–11 of the drawings, except with respect to the various changes or modifications as described in connection with such embodiments.

Reference is now made to FIGS. 11–17 for a description of the combined motor and mechanical drive that imparts both rotational and reciprocating motion to the output motor shaft 11. Preferably, the output motor shaft is reciprocated at a rate substantially less than the rotation of the output motor shaft 11 to provide the desired rotary and reciprocating or oscillating movement of the output motor shaft 11 for transmitting the same rotational and reciprocating motion to a spindle sander sleeve or belt sander mounted on the output motor shaft 11, as described in connection with the embodiments illustrated in FIG. 3–8 of the drawings.

As has been indicated above, it was discovered that a belt sander could also favorably employ the rotational and reciprocating motion as described in connection with the oscillating spindle sander illustrated in my aforementioned copending patent application Ser. No. 08/233,278 filed Apr. 26, 1994, entitled COMBINED MOTOR AND MECHANICAL DRIVE USED IN OSCILLATING SPINDLE SANDER, now U.S. Pat. No. 5,549,507. Thus, the mechanism described below corresponds to the combined motor and mechanical drive used in the oscillating spindle sander of my aforementioned copending patent application, adapted or modified as described in connection with FIGS. 3–8 above, to permit operation of the sander 1 as either a belt sander or spindle sander, as may be desired.

Figure 14:
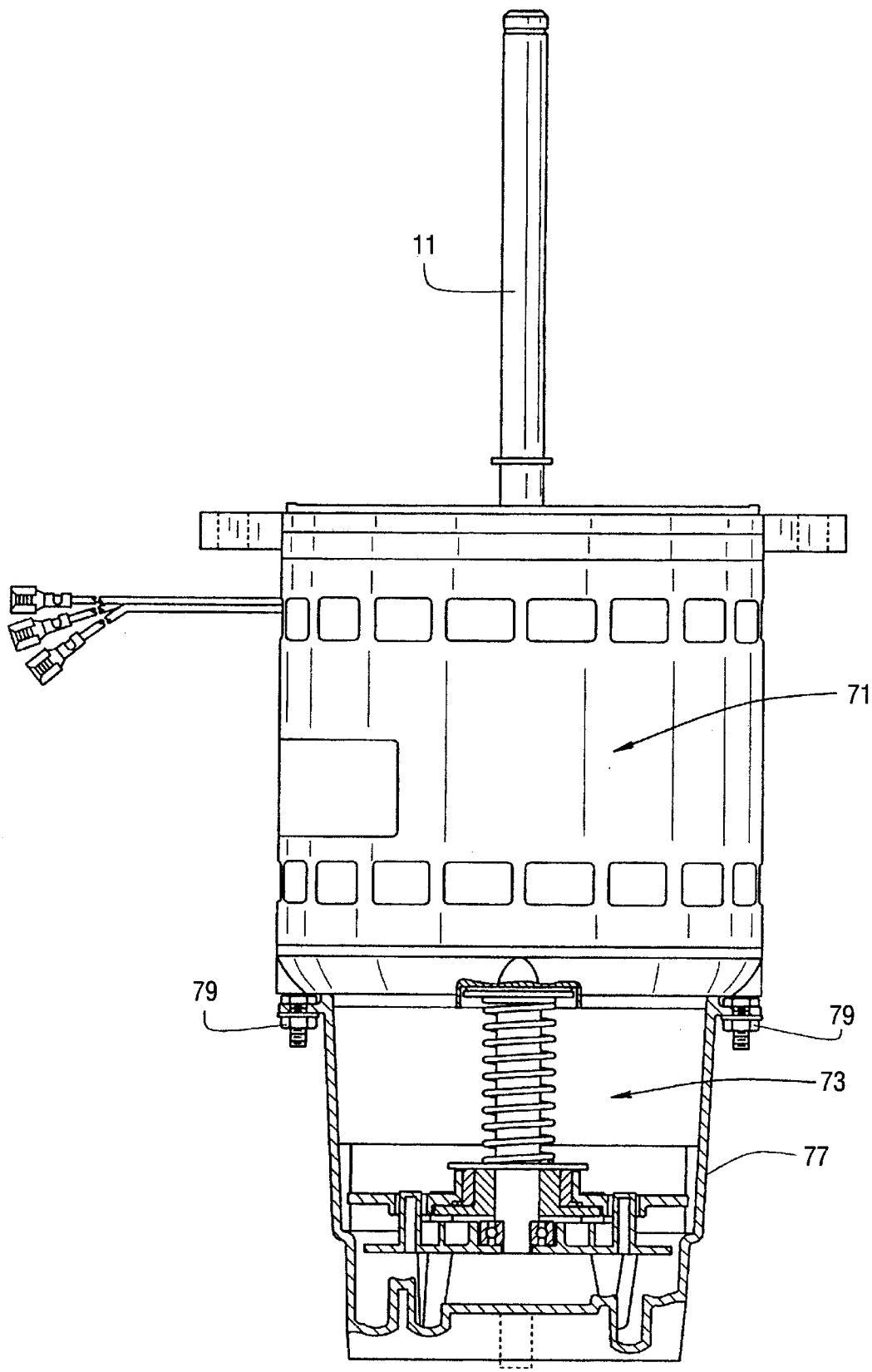
FIG. 14 is an enlarged side elevational view, partly in section, of the combined motor and mechanical drive used in driving the oscillating belt/spindle sander of the present invention.

As best illustrated in FIGS. 12–14 of the drawings, the combined motor and mechanical drive includes a motor 71 and a mechanical drive 73. The motor 71 is mounted through the supporting plate 75 at its upper end to suitable frame supports (not shown), such as those illustrated in my aforementioned copending patent application. The suitable frame supports (not shown) extend between the worktable 3 and the motor 71 or are supported by the frame 5 in any suitable manner, as may be desired.

As illustrated in FIG. 12 of the drawings, the output motor shaft 1 extends through the opening 9 in the depression 7 for driving a spindle sander sleeve or belt sander in the manner described above. In order to accomplish the desired combined rotational and reciprocating movement for the output motor shaft 11, the output motor shaft 11 is rotated by the motor 71 while the motor shaft 11 is also driven axially, through the unique construction of the mechanical drive 73, to provide the dual motion rotating and reciprocating movement for the output motor shaft 1, as will now be described in detail.

The mechanical drive 73 includes a housing 77 which is connected to the lower end of the motor 71 through the fasteners 79, 79. A lower motor shaft 81 depends from the motor 71 into the housing 77. Of course, the lower motor shaft 81 is integrally connected as a single shaft to the output motor shaft 11, through motor 71, as will be apparent.

Thrust washers 83, 85, at an upper end of the lower motor shaft 81 adjacent the motor 71 and a lower thrust washer 87 extend on opposite sides of a coil spring 89 that surrounds the lower motor shaft 87b. The coil spring 89 enables the lower motor shaft 81 to move axially upwardly and downwardly through the mechanism now to be described, with resilient collapsing and expansion of the coil spring 89 during the axial upward and downward movement of the lower motor shaft 81.

Figure 15:
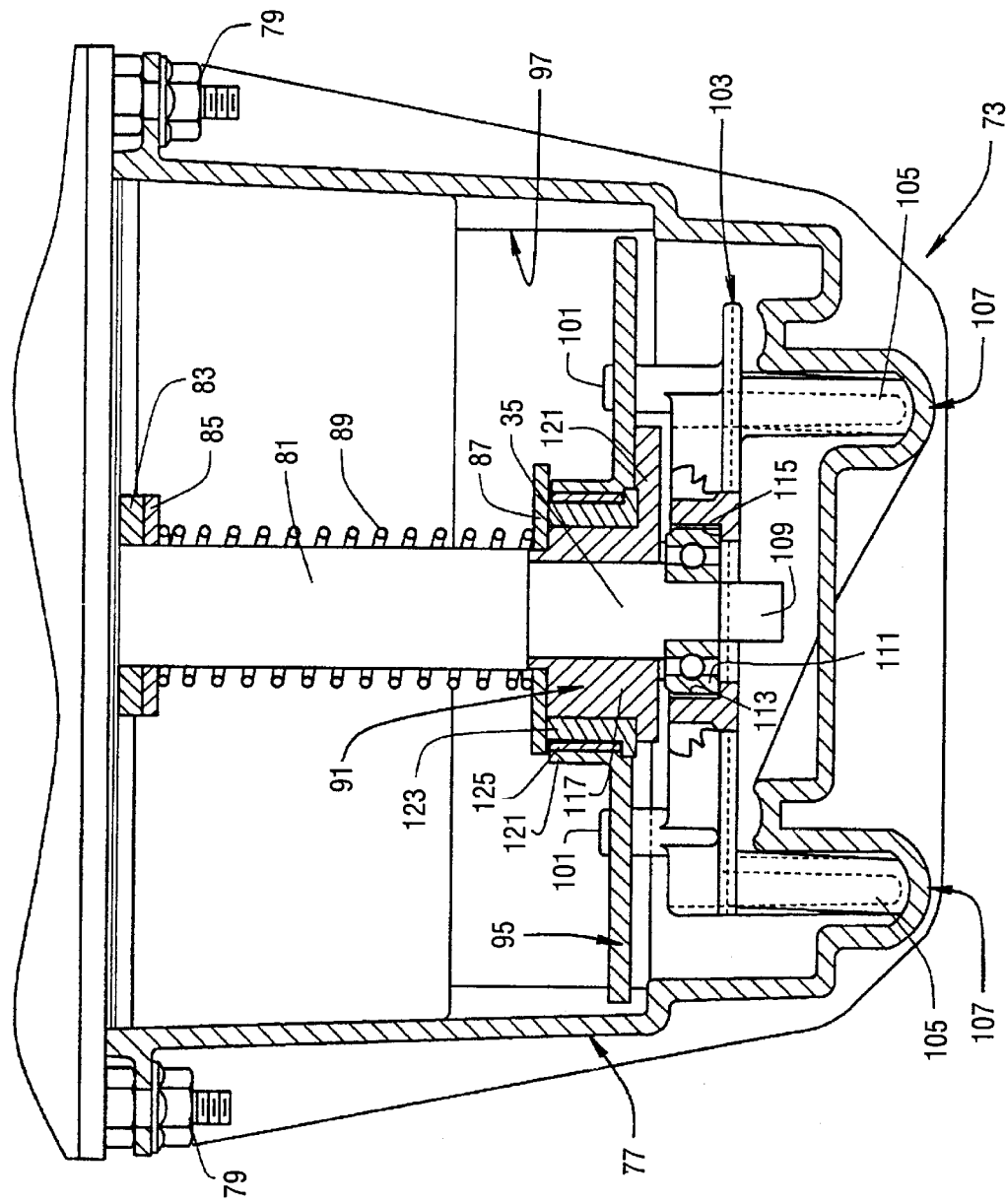
FIG. 15 is a fragmentary side elevational view, principally in section, illustrating the construction of the mechanical drive portion of the combined motor and mechanical drive system.
Figure 16:
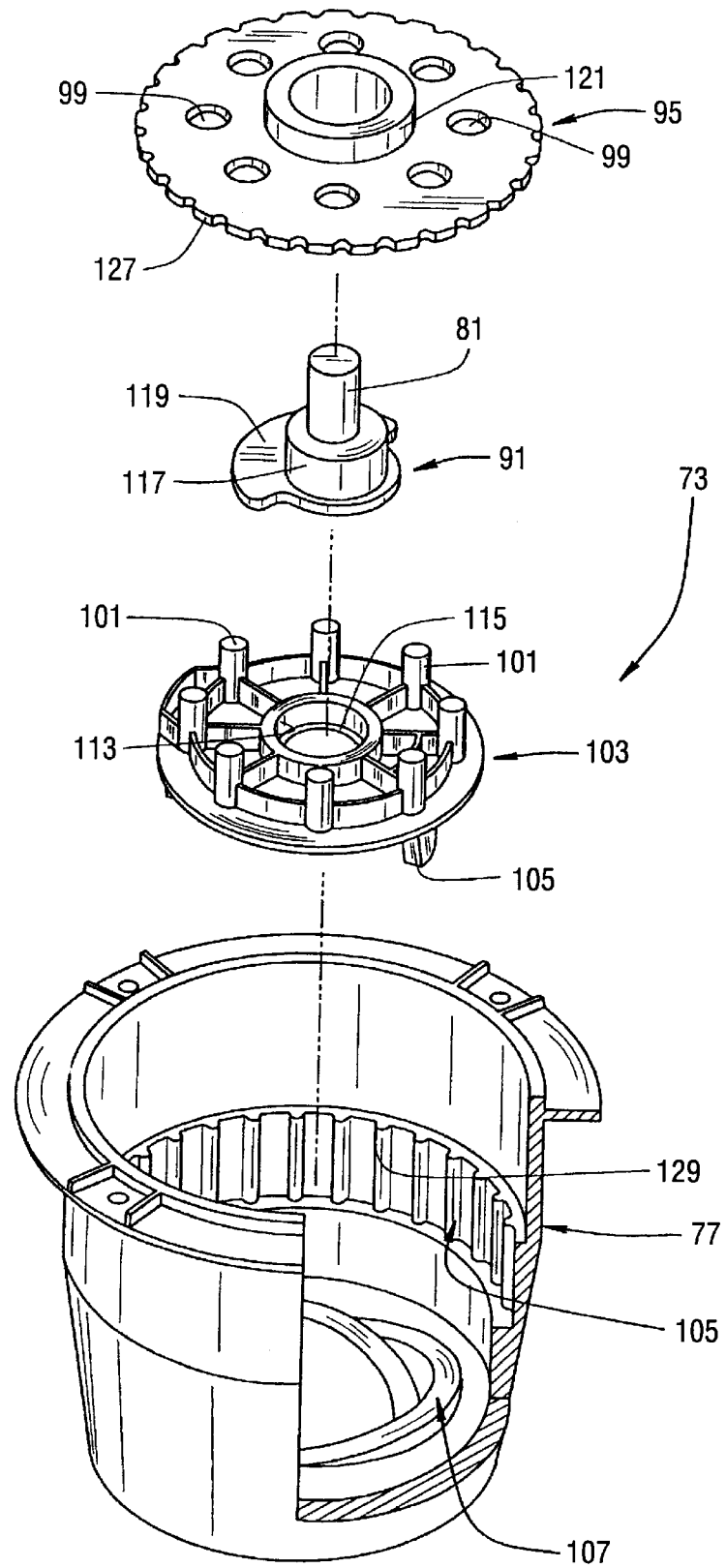
FIG. 16 is an exploded perspective view of the components of the mechanical drive portion of the combined motor and mechanical drive system.

To provide this upward and downward axial movement of the lower motor shaft 81, the mechanical drive 73 includes a speed reducer that is coaxial with the lower motor shaft 81. The speed reducer includes an eccentric 91 that is mounted on a first reduced shaft portion 93. A cycloidal gear 95 is mounted on the eccentric 91 and is sized and constructed to engage a ring gear 97 mounted on the internal wall of the housing 77, as best seen in FIGS. 15–16. Holes 99 in the cycloidal gear 95 drive the pins 101 of the cam follower 103. Depending legs 105 extend downwardly from the cam follower 103 and engage a cam profile 107 molded into the internal bottom wall section of the housing 77.

With the above general description of the components forming the mechanical drive 73, reference is further made to FIGS. 15–17 of the drawings for the specific construction of such components. More particularly, the lower motor shaft 81, in addition to the first reduced shaft section 93 upon which the eccentric 91 is mounted, includes a second reduced shaft section 109 which is received within the ball bearing 111, the latter being supported by the cam follower 103. Note that the bearing 111 is received within a central opening 113 of the cam follower 103 with the ball bearing 111 resting on a restricted or internal shoulder 115 adjacent a lower inner end of the central opening 113. Thus, the ball bearing 111 rests on the restricted or internal shoulder 115 of the cam follower 103 while rotatably supporting the second reduced section 109 of the lower motor shaft 81, as will be apparent.

The eccentric 91 includes an eccentric portion 117 that is integrally formed with a lower offset flange 119 that underlies the cycloidal gear 95, as best seen in FIGS. 15–16 of the drawings. The cycloidal gear 95 includes an integral upstanding collar 121 which is arranged to fit over the eccentric portion 117 of the eccentric 91. Positioned intermediate the eccentric portion 117 and the upstanding collar 121 is bushing 123 and splined element 125 for fixedly mounting the cycloidal gear 95, through the upstanding collar 121, to the eccentric portion 117 of the eccentric 91. As a result, the cycloidal gear 95 will be jointly rotated when the eccentric 91 is rotated by the lower motor shaft 81.

The eccentric 91 is driven at motor speed through the lower motor shaft 81, and as it rotates, the eccentric 91 pushes the teeth 127 of the cycloidal gear 95 into engagement with the gear teeth 129 of the stationary ring gear 97 molded on an internal wall of the housing 77. The cycloidal gear 95 has one less tooth 127 than the gear teeth 129 of the ring gear 97. In the illustrated embodiment, the cycloidal gear 95 has twenty-nine (29) teeth while the ring gear 97 has thirty (30) teeth. As a result, the cycloidal gear 95 makes one-thirtieth (1/30) of a revolution in the opposite direction as the motor shaft 81 makes one complete revolution. However, since the cycloidal gear is off-center from the lower motor shaft 81, due to the mounting of same on the eccentric portion 117 of the eccentric 91, the speed reducer employs an additional element to arrive at a true rotational output.

The output element is in the form of upstanding pins 101 which extend upwardly into the cam follower 103 that are driven by the holes 99 in the cycloidal gear. The gear holes 99 are sized so that at all times there is line contact between each hole 41 and corresponding pin 101. As will become more apparent from the discussion in connection with FIGS. 17A through 17B of the drawings that follow, this provides a constant-velocity joint.

The end result of the cycloidal gear reduction is that the cam follower 103 rotates at one-thirtieth (1/30) of the motor speed. Depending legs 105 incorporated into the cam follower 107 are constructed to follow a cam profile 107 which is molded into the internal bottom wall of the housing 77, as best seen in FIG. 16. The cam profile 107 provides a gradual serpentine rise and decline for driving the motor shaft 81 axially, in order to reciprocate same.

The cycloidal mechanical drive 73 transmits power equal to that of gears, but in a smaller and more efficient package. In contrast to the circular motion of gears, the cycloidal drive mechanism uses the eccentric 91 to convert input rotation from the lower motor shaft 81 into a wobbly cycloidal motion. This cycloidal motion is then converted back into smooth, concentric output rotation. In the process, speed reduction occurs.

The term cycloidal is derived from hypocycloidal, which is defined as the curve traced by a point on the circumference of a circle that is rotating inside the circumference of a larger fixed circle. A common example of this motion is the path traced by a tooth of a planetary pinion rotating inside a ring gear.

While worm gearing experiences a dramatic loss of efficiency in going from low to high output input/output speed ratios, and helical gearing loses efficiency of high ratios because two or more stages of reduction are required, cycloidal drives achieve reduction rates as high as 200:1 in a single stage, while still maintaining moderately high efficiencies. Moreover, because cycloidal drive components interact in a rolling fashion, failure is generally not catastrophic. As in a bearing, fatigue in the rolling surfaces of a cycloidal drive causes noise levels to gradually increase, serving as a warning long before complete drive failure occurs.

Heat generation, attributable mainly to mechanical losses and the power being transmitted, is readily dissipated through the large surface area of other types of gears. But cycloidal drives, like worm gears, must dissipate heat through a smaller housing surface area. However, since efficiency in cycloidal drives is higher than worm gearing of equal capacity and ratio, less heat is generated in cycloidal units. Consequently, the auxiliary cooling often required for worm units is usually not needed for cycloidal drives. Although not as efficient as spur or helical gearing, cycloidal drives offer substantially higher efficiency than worm gearing. The concentric shaft orientation also proves valuable, as does the cycloidal drives compact size and high reduction capability.

Reference is now made to FIGS. 17A through 17F of the drawings which illustrate various positions of the cycloid gear 95 and housing ring gear 97 relative to the pins 101 of the cam follower 103, eccentric 91 and shaft 81 for an explanation of the various relative position of such components during a single revolution of the lower motor shaft 81 from 0° to 360.

FIGS. 17A through 17C show rotation of the lower motor shaft 81 from 0° to 45° to 90°, with the associated arrow demonstrating the various rotational positions of the lower motor shaft 81 relative to the eccentric 91 and the pins 105 of the cam follower 103 which respect to the holes 99 of the cycloidal gear 95 and its relative position to the ring gear 97. As previously explained, the cycloidal gear 95 rotates one-thirtieth (1/30) of a revolution in the opposition direction as the lower motor shaft 81 makes on complete revolution. FIGS. 17A through 17C show approximately one-quarter (1/4) of a revolution of the lower motor shaft 81.

Figure 17E:
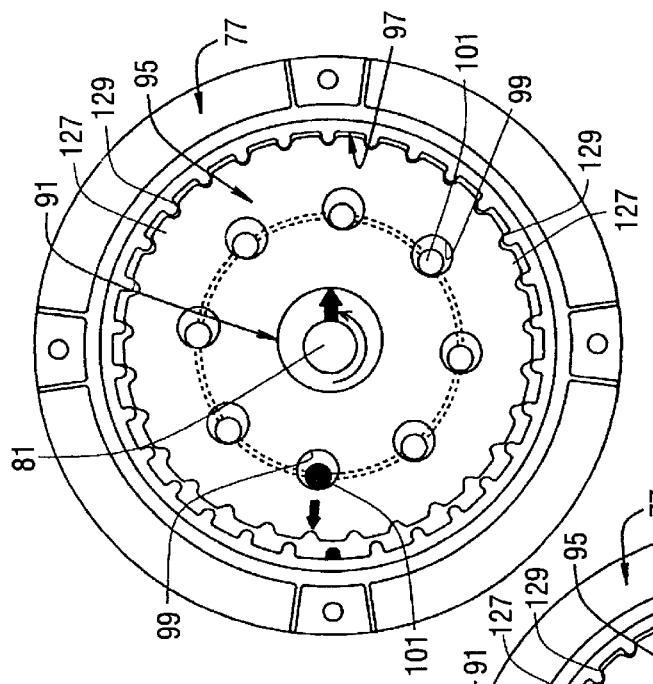
FIG. 17E is a partially schematic top plan view of the mechanical drive illustrating the position of the cycloid gear and housing ring gear relative to the output element/cam follower and eccentric where the position of the motor shaft is illustrated by associated arrow at 180° rotation.
Figure 17F:
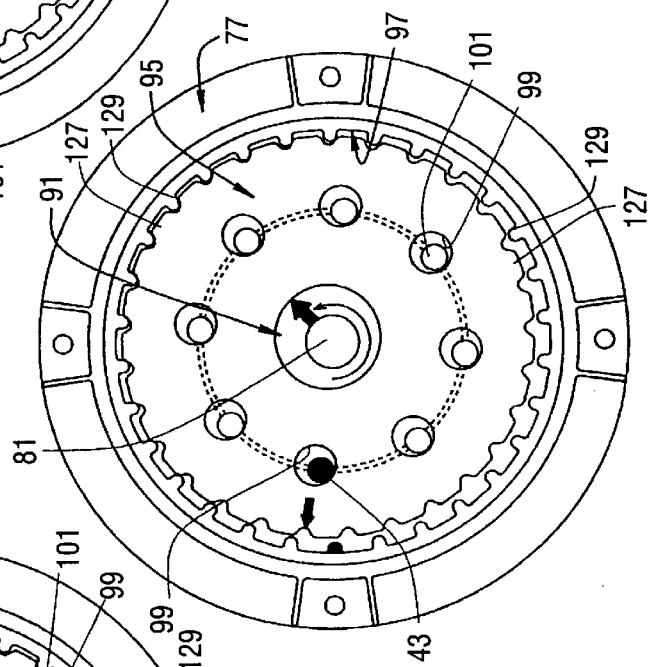
FIG. 17F is a partially schematic top plan view of the mechanical drive illustrating the position of the cycloid gear and housing ring gear relative to the output element/cam follower and eccentric where the position of the motor shaft is illustrated by associated arrow at 225° rotation.
Figure 17D:
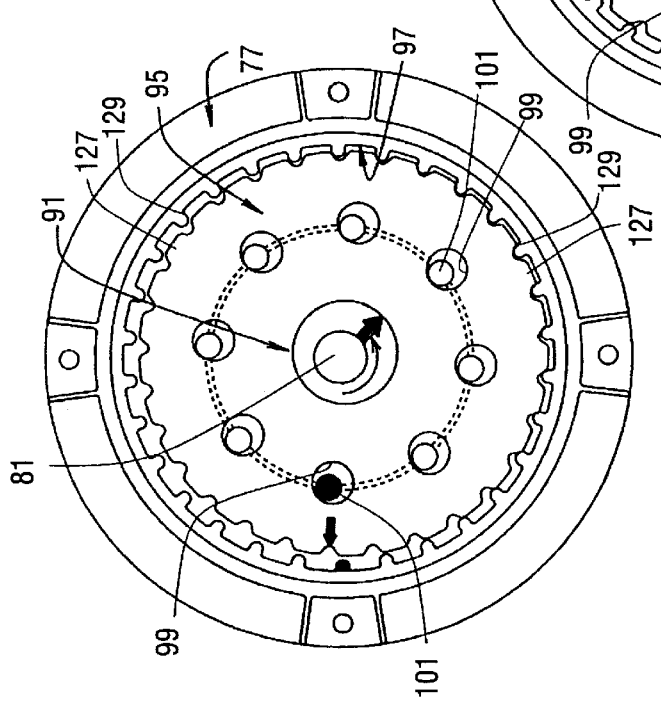
FIG. 17D is a partially schematic top plan view of the mechanical drive illustrating the position of the cycloid gear and housing ring gear relative to the output element/cam follower and eccentric where the position of the motor shaft is illustrated by associated arrow at 135° rotation.

FIGS. 17D through 17F show the relative position of the parts at 135°, 180° and 225°, respectively. Similarly, FIGS. 17G through 17I of the drawings illustrates the motor shaft at positions of 270°, 315° and 360° respectively.

Since the cycloidal gear 95 is off center from the lower motor shaft 81 due to the eccentric 91, the pins 101 of the cam follower 103 are driven by the holes 99 in the cycloidal gear 95. As can be seen in analyzing FIGS. 17A through 17I of the drawings, the gear holes 99 are sized so that at all times there is a line contact between each hole 99 and corresponding pin 101. This is what produces a constant velocity joint with the end result of cycloidal gear reduction where the cam follower 103 rotates at one-thirtieth (1/30) of the motor speed. Axial movement is made possible through the depending legs 105 that extend downwardly from the cam follower 103 for engagement with the cam profile 107 in the inner bottom wall of the housing 77. This produces the desired axial or reciprocating movement of the lower motor shaft 81, as well as in the output motor shaft 11, while the output motor shaft 11 is also rotated by the motor 71.

From the foregoing, it will be appreciated that the mechanical drive 73 provides speed reduction through the cycloidal gear mechanism. The output element of the gear train, namely the holes and pins in the cycloidal gear and cam follower, respectively, drives the cam follower to track the cam profile in the lower inner bottom wall of the housing. This drives the motor shaft axially during rotation of the motor shaft by the motor. The end result is a motor shaft that rotates at motor speed, while oscillating by reciprocating or axially moving at a rate much lower than the motor speed. In the illustrated embodiment, the oscillation or reciprocation of the motor shaft axially is at one-thirtieth (1/30) of the motor speed.

In addition, it will be appreciated that the combined motor and mechanical drive can be usefully employed in a belt sander or spindle sander, particularly when the output motor shaft end is constructed or arranged to facilitate conversion between a belt sander or spindle sander, as has been discussed above.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

We claim:

1. A sander having a worktable for supporting a workpiece, a motor shaft extending upwardly through said worktable and supporting a sanding surface, a combined motor and mechanical drive for transmitting rotational and reciprocating motion to said motor shaft and including input and output motor shaft ends, the motor operating to impart rotational motion through said output motor shaft end and the mechanical drive being connected to the input motor shaft end of said motor for also imparting reciprocating motion through said output motor shaft end at a rate substantially less than the rotational speed of the output motor shaft end, and the output motor shaft end providing interchangeable mounting of different sanding surfaces.

2. The sander as defined in claim 1 wherein the sanding surface is a spindle sanding sleeve surface.

3. The sander as defined in claim 1 wherein the sanding surface is a sanding belt surface.

4. The sander as defined in claim 1 in which the output motor shaft end interchangeably receives a spindle sander sleeve or a drive belt/pulley system.

5. The sander as defined in claim 4 in which the output motor shaft end and the drive belt/pulley system have complementary engaging elements restricting rotation between same.

6. The sander as defined in claim 5 in which the output motor shaft end includes external splines for complementary reception by an internally splined element associated with the drive belt/pulley system.

7. The sander as defined in claim 6 wherein the internally splined element is an internally splied drive pulley that is part of said drive belt/pulley system for driving a sanding belt.

8. The sander as defined in claim 6 wherein the output motor shaft end includes a threaded shaft end which extends beyond the external splines for threaded connection to the spindle sander sleeve.

9. The sander as defined in claim 1 including a driving pulley fixed to the output motor shaft end that is connected by a belt to a driven pulley fixed to a drive shaft laterally spaced from the output motor shaft end, said drive shaft facilitating interchangeable mounting of a spindle sander sleeve or a driven pulley of a drive belt/pulley system for driving a sanding belt.

10. The sander as defined in claim 1 including a support plate mounted to the output motor shaft end and a drive shaft mounted to the support plate in laterally offset relationship to the output motor shaft end, said drive shaft being driven by a belt connected to the output motor shaft end, the drive shaft being capable of directly driving a spindle sander, and a belt platen for a sanding belt including drive and idle drums, platen bed and tensioning mechanism interchangeably mounted to the support plate by interconnecting the drive shaft to the drive drum of the sanding belt for driving a sanding belt mounted on the belt platen.

11. The sander as defined in claim 1 wherein the output motor shaft end directly drives a spindle sander sleeve or a driven drum of a drive belt/pulley system for driving a sanding belt.

12. The sander as defined in claim 4 wherein the spindle sander sleeve or drive belt/pulley system is releasably secured to the output motor shaft end.

13. The sander as defined in claim 1 wherein said input motor shaft end is interconnected to said mechanical drive which is operably interconnected to said housing for imparting reciprocating motion to said output motor shaft end.

14. The oscillating spindle sander as defined in claim 13 wherein the motor shaft drives a speed reducer that is coaxial with the motor shaft, said speed reducer driving a cam follower that engages a cam in the housing for imparting the reciprocating motion to said output motor shaft end.

15. The oscillating spindle sander as defined in claim 14 wherein the speed reducer includes a cycloidal gear that engages a complementary ring gear provided in the housing.

16. An oscillating sander having a worktable for supporting a workpiece, a motor shaft extended upwardly through said worktable and supporting a sanding surface, an electrical motor supported by said worktable and driving said motor shaft, said motor shaft having an output motor shaft end and an input motor shaft end, and a mechanical drive supported by and below said motor, said mechanical drive being connected to said input motor shaft end for imparting axial motion to said output motor shaft end during rotation of said motor shaft, and said output motor shaft end being constructed to interchangeably receive a spindle sander sleeve or a sanding belt.

17. The oscillating sander as defined in claim 16 wherein the output motor shaft end includes a threaded end section for threaded connection to the spindle sander sleeve.

18. The oscillating sander as defined in claim 16 wherein the output motor shaft end and the drive belt/pulley system have complementary engaging elements restricting rotation between same.

19. The oscillating sander as defined in claim 16 wherein the output motor shaft end drives a laterally spaced drive shaft through a connecting belt, said drive shaft directly driving a spindle sander sleeve or a driven pulley of a drive belt/pulley system for driving a sanding belt.

20. The oscillating sander as defined in claim 16 including a supporting plate mounted to the output motor shaft end that supports a laterally offset drive shaft driven by the output motor shaft end, said drive shaft driving a spindle sander or a driven drum of a belt platen about which a sanding belt is mounted.

21. The sander as defined in claim 16 wherein the output motor shaft end directly drives either said spindle sander sleeve or a driven drum of said drive belt/pulley system for driving a sanding belt.

22. An oscillating belt sander having a worktable for supporting a workpiece, a drive shaft extending upwardly through said worktable for driving a belt sander sanding surface, means for transmitting rotational and reciprocating motion to said drive shaft to provide rotational and reciprocating motion to said belt sander sanding surface at a rate substantially less than the rotational speed of said belt sander sanding surface.

* * * * *

UNITED STATES PATENT AND TRADEMARK OFFICE
CERTIFICATE OF CORRECTION

| | | |
|---|---|---|
| PATENT NO. | : | 5,916,014 |
| DATED | : | June 29, 1999 |
| INVENTOR(S) | : | James D. Schroeder and George E. Hendrix |

It is certified that error appears in the above-identified patent and that said Letters Patent is hereby corrected as shown below:

On the title page under [73] Assignee, please correct the name and address of the Assignee from "Emerson Special Products Division, Hazelwood, MO." to "Emerson Electric Co., St. Louis, MO."

Signed and Sealed this

Twenty-third Day of May, 2000

*Attest:*

Q. TODD DICKINSON

*Attesting Officer*     *Director of Patents and Trademarks*